United States Patent [19]
Fussell, Jr. et al.

[11] 3,810,267
[45] May 14, 1974

[54] BOAT WINDSHIELD MOUNTING MEANS
[75] Inventors: Edward B. Fussell, Jr., Altamonte Springs; F. Charles Maynard, Jr., Eustis, both of Fla.
[73] Assignee: Walter Bonnet, Inc., Casselberry, Fla.
[22] Filed: Sept. 26, 1973
[21] Appl. No.: 400,976

[52] U.S. Cl. .................................. 9/1 R, 296/84 A
[51] Int. Cl. ........................................... B63b 17/00
[58] Field of Search ............ 9/1 R; 244/121, 129 W; 296/84 R, 84 A, 84 D; D14/6 F

[56] References Cited
UNITED STATES PATENTS
3,021,535  2/1962  Dorst ..................................... 9/1 R
3,304,657  2/1967  Singleton ............................... 9/1 R
3,654,648  4/1972  Wilhoit .................................. 9/1 R Primary Examiner—Duane A. Reger
Assistant Examiner—Jesus D. Sotelo
Attorney, Agent, or Firm—D. Paul Weaver

[57] ABSTRACT

A gasketed windshield holding frame rests on top of a boat deck or hood and is held down securely by an anchoring bracket or plate having a flange which interlocks with a groove formed in either the outer or inner side of the windshield frame near the bottom thereof. It is unnecessary to pierce through the boat deck and variations in windshield rake and boat deck contour can be accommodated.

10 Claims, 3 Drawing Figures

3,810,267

BOAT WINDSHIELD MOUNTING MEANS

BACKGROUND OF THE INVENTION

Pending Federal regulations require flotation material to be attached to the underside of boat decks or hoods in the windshield region. This will make it undesirable to pierce through the deck and attach a windshield frame by the use of through bolts, as has been customary in many instances.

An objective of this invention is to enable compliance with the pending regulations through the provision of a secure anchoring arrangement for boat windshields which does not require the use of through bolts or other means necessitating piercing entirely through the deck or hood. However, the invention features a structure whereby, in the interim period before the mentioned regulation becomes effective and in certain other isolated instances which may exist after the regulation is effective, the usual T-bolt anchoring means may still be employed in conjunction with or separately from the invention.

An important feature of the invention is the ability of the unique hold-down bracket or plate to be installed on the inside or outside of the boat windshield frame or in both locations if additional security is desired. Specially contoured grooves in the extruded frame coact with flanges of the hold-down brackets to accommodate variations in windshield angle or rake as well as variations in deck slope or contour. Additional support is rendered by side windshield frames and adjustable braces at the interior ends of outer windshield sections.

The invention features versatility in that the structure is applicable to a wide variety of boats. The windshield frame sections and the coacting hold-down brackets may be cut to length and a variable member of anchoring screws may be employed in the bracket depending upon its length. In some instances, the hold-down bracket may be extruded integrally with the windshield frame. Compressible gasketing under the frame and bracket compensates for small deck irregularities.

Other features and advantages of the invention will become apparent during the course of the following detailed description.

BRIEF DESCRIPTION OF DRAWING FIGURES

DETAILED DESCRIPTION

Figure 1:
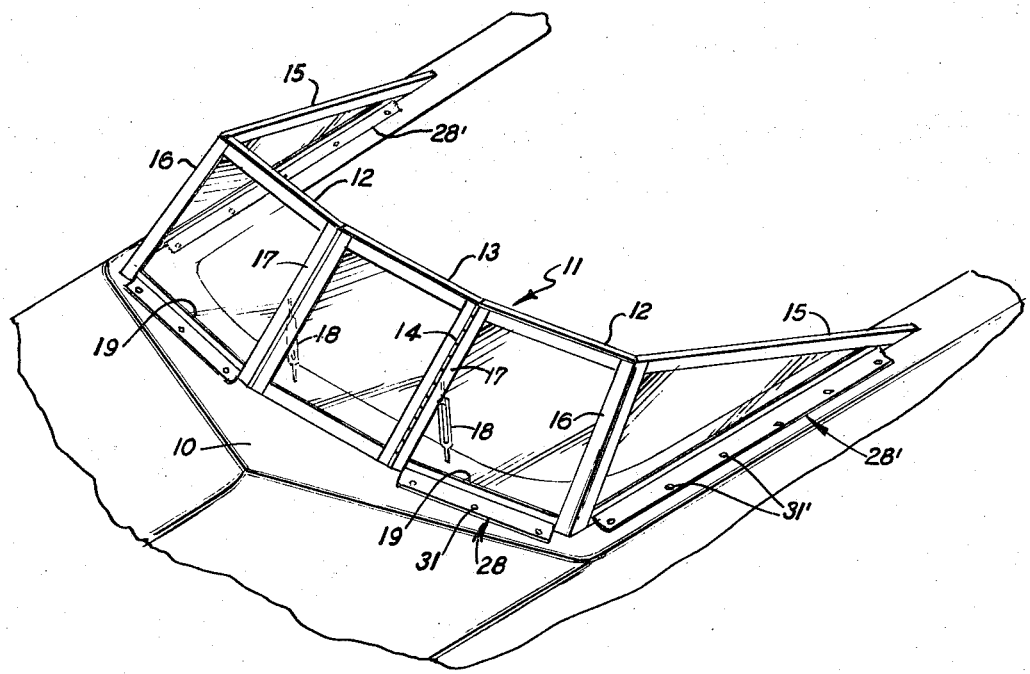
FIG. 1 is a fragmentary perspective view of a boat windshield and mounting or anchoring means embodying the invention.

Referring to the drawings in detail and referring first to FIG. 1, the numeral 10 designates the boat deck or hood surface upon which a sectional windshield 11 is mounted utilizing the present invention hold-down or anchoring means. In the embodiment shown, the windshield 11 comprises a pair of fixed side sections 12 and an intermediate section 13 which is hinged to one of the side sections by a generally vertical hinge 14. This allows the center section 13 to swing open for a walk-through arrangement. The two fixed windshield sections 12 preferably include outer side frames 15 which add rigidity to the construction and these side frames when employed are rigidly connected to the side sections 12 in a manner to provide corner posts 16. The construction in this respect may be conventional. The interior posts 17 of windshield side sections 12 are further connected with adjustable braces 18, similar to turnbuckles, which extend between the windshield and deck.

The invention proper is concerned with the holding down or anchoring of extruded lower frame sections 19 of the two side windshield sections 12. The invention is also applicable to the side frames 15, as will be further discussed.

Figure 2:
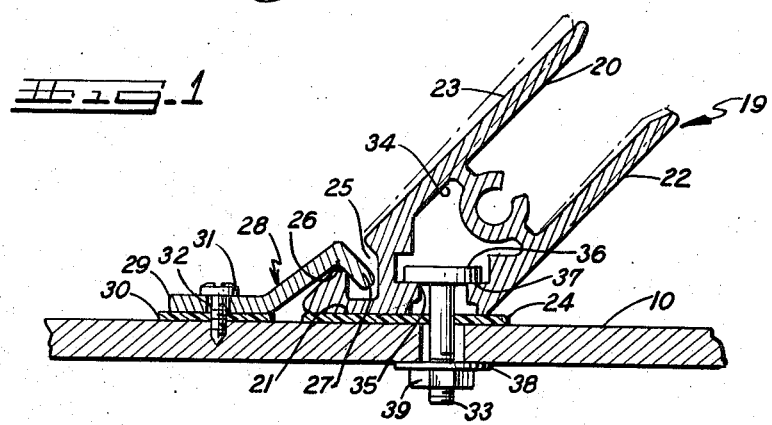
FIG. 2 is an enlarged fragmentary vertical cross section taken through the windshield and anchoring means.

Referring to FIG. 2 of the drawings, the deck portion 10 of the boat is shown along with one of the lower windshield frame extrusions or bars 19. The frame section or bar 19 has a windshield glass edge receiving socket 20 of conventional formation. The bottom face 21 of frame section 19 is disposed at the necessary acute angle to the parallel inner and outer faces 22 and 23 of the frame to produce the desired windshield rake. Interposed between the bottom face 21 and deck surface is a preferably vinyl compressible gasket strip 24 which may be adhered to the deck with a suitable adhesive when the windshield is being installed. The gasket 24 spans the entire flat bottom face 21 of the particular windshield section 12.

In its forward side and near and above the bottom surface 21, frame member 19 is further provided with a groove 25 which extends for the entire length of the frame section or member. This groove opens through the forward angled side of the frame member and the groove is quite wide at its mouth and in its interior and is radiused at 26 and in its interior corners to properly receive and accommodate an approximately right angular flange 27 of a rigid hold-down bracket or plate 28. The bracket 28 and its flange 27 are coextensive in length with the frame member 19 and its groove 25. The particular shape and size of the groove 25 in relation to the flange 27 is such that variations in windshield slope can be accommodated by the interfitting parts as well as variations in boat deck slope. Such windshield slope variation is indicated in broken lines in FIG. 2. The bracket 28 has an integral mounting flange 29 below which is positioned a second vinyl gasket 30, cemented or otherwise attached to the deck 10. A preferred number of anchoring screws 31 are engaged through spaced openings 32 of the flange 29 and have threaded engagement with the deck 10, without piercing entirely therethrough. When applied, the screws 31 will pierce their way through the gasket 30. The number and placement of the screws 31 will depend upon the size of the particular windshield section 12, and in this connection the invention is applicable to a wide variety of boats and boat sizes. The extruded frame members 19 may be cut to length as may the hold-down brackets 28, and a greater or lesser number of anchoring screws 31 may be employed to accommodate a given installation.

In any case, when the bracket 28 is tightened into place by means of screws 31, it will exert a secure clamping force on the frame member 19 so as to anchor the windshield section 12 very securely to the deck with the two gaskets 24 and 30 compressed.

While no other windshield mounting or anchoring means is required for a secure installation, nevertheless the extruded member 19 is constructed to accommodate the conventional through bolt means 33 which may be employed in some instances, particularly in the interim period prior to new Federal flotation regulations taking effect. This through bolt means may, if desired, be utilized with the hold-down bracket 28 for an even more firm windshield mounting.

To accommodate the through bolt means 33, frame member 19 has an extruded internal chamber 34 having a restricted mouth 35 somewhat narrower than the head 36 of bolt 33 so that such head will seat upon a ledge 37 of the frame member 19 and exert a downward holding force thereon. Below the deck 10, the bolt means 33 carries a suitable washer 38 and nut 39, as shown. A desirable number of bolts 33 may be placed at intervals along the windshield frame member 19. It will be noted that the use of the invention bracket 28 and associated parts in no way interferes with the use of the more conventional through bolt means whenever the latter is deemed desirable.

With reference to FIG. 1, it may be seen that the invention embodying the hold-down bracket 28 and coacting groove 25 is equally applicable to the side frames 15 when the latter are employed. As shown, elongated hold-down brackets 28' and anchoring screws 31' may be utilized on the side frames 15 in precisely the manner shown and described in FIG. 2 for the side windshield sections 12.

Figure 3:
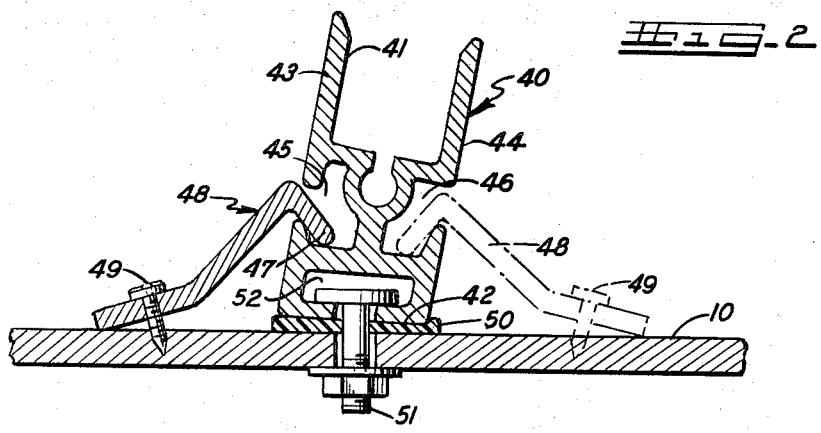
FIG. 3 is a similar cross sectional view showing a modification.

FIG. 3 shows a modification of the invention wherein the boat windshield side sections have a lesser degree of rake or slope compared to the showing in FIG. 2. In FIG. 3, a lower frame section or member 40 has a windshield glass socket 41 and a flat bottom face 42 arranged at the necessary angles to the parallel outer and inner surfaces 43 and 44 of the windshield frame. A pair of grooves 45 and 46 are formed in the inner and outer sides of member 40 near the bottom thereof to receive adjustably the lateral flange 47 of a hold-down bracket 48 similar in construction and function to the previously-described bracket 28. The bracket 48, in turn, is secured to the deck 10 by a suitable number of screws 49 which do not completely penetrate the deck.

As in the prior form of the invention, a vinyl gasket 50 is interposed between the bottom of frame member 40 and the deck and a conventional T-bolt 51 may be utilized in conjunction with or separately from the hold-down bracket 48 to anchor the windshield as described in the previous embodiment. As shown in broken lines in FIG. 3, the bracket 48 may be installed in some cases on the interior side of the windshield utilizing the slot 46. For added stability, both interior and exterior hold-down brackets may be employed together with or without the bolts 51. As in the prior embodiment, the grooves 45 and 46, as well as a channel 52 for the heads of bolts 51 are all formed by extrusion for simplicity and economy. In some instances, it may be feasible to extrude the member 40 and bracket 48 as a single unit and the same applies to the construction shown in FIG. 2. FIG. 3 shows the bracket 48 and member 40 before final tightening of the fastener elements.

As shown in FIG. 1, the side frames 15 may likewise be equipped with the hold-down brackets 28' interiorly as well as exteriorly.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A boat windshield mounting device comprising a windshield frame member adapted to rest upon a boat deck surface and having an inclined side, a groove formed in said inclined side near and above the bottom of said member and extending throughout the length of said member, and a hold-down bracket for said member including a body portion attachable to a boat deck and having a lateral flange adapted to enter said groove and to interlock therewith, said flange being substantially coextensive in length with said groove, said groove being of a size and shape to allow limited angular adjustment of said member relative to said bracket.

2. The structure of claim 1, and a compressible gasket element interposed between the bottom of said member and bracket and an underlying boat deck.

3. The structure of claim 1, and said member having a longitudinal channel opening through its bottom face and said channel having a restricted outlet forming a ledge portion on each side of said outlet, and hold-down bolts disposed within said channel with heads of the bolts arranged above said ledge portions, said bolts adapted to extend through boat deck openings.

4. The structure of claim 1, and said bracket body portion being inclined generally in the direction of inclination of said inclined side of said member, and a level mounting portion on said bracket at the side thereof remote from said lateral flange.

5. The structure of claim 4, and said lateral flange being generally perpendicular to said bracket inclined portion.

6. The structure of claim 1, and said frame member having a second groove formed in its interior side substantially opposite the first-named groove and adapted to receive a lateral flange of a second hold-down bracket also attachable to a boat deck.

7. The structure of claim 1, and said frame member having a flat bottom face disposed at an acute angle to the forward inclined side of said member and establishing the rake angle of the windshield when in contact with a boat deck.

8. The structure of claim 1, and said hold-down bracket further including a deck mounting portion having longitudinally spaced openings formed therethrough to receive a like number of fastener screws which have threaded engagement with an underlying boat deck.

9. The structure of claim 1, and said windshield frame member having a windshield glass socket formed therethrough to receive the lower edge portion of a glass panel.

10. The structure of claim 1, and said groove formed in said inclined side being oversize relative to said lateral flange and being radiused at its mouth and internally to allow limited swinging of the flange relative to the frame member.

* * * * *

UNITED STATES PATENT OFFICE
CERTIFICATE OF CORRECTION

Patent No. 3,810,267         Dated May 14, 1974

Inventor(s) EDWARD B. FUSSELL, JR. and F. CHARLES MAYNARD, JR.

It is certified that error appears in the above-identified patent and that said Letters Patent are hereby corrected as shown below:

The name of the assignee is shown as "Walter Bonnet, Inc.". The correct name of the assignee is --WATER BONNET, INC.--.

Signed and sealed this 8th day of October 1974.

(SEAL)
Attest:

McCOY M. GIBSON JR.                    C. MARSHALL DANN
Attesting Officer                       Commissioner of Patents